(12) United States Patent
El Markhi et al.

(10) Patent No.: US 11,119,557 B2
(45) Date of Patent: Sep. 14, 2021

(54) HOST HARDWARE RESET BASED ON ADAPTER REMOVAL PATTERN

(71) Applicant: TEXAS INSTRUMENTS INCORPORATED, Dallas, TX (US)

(72) Inventors: Mustapha El Markhi, Richardson, TX (US); Rohit Bhan, Plano, TX (US); Thomas Vermeer, Plano, TX (US); Norelis Medina, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 190 days.

(21) Appl. No.: 16/260,693

(22) Filed: Jan. 29, 2019

(65) Prior Publication Data
US 2020/0241620 A1 Jul. 30, 2020

(51) Int. Cl.
*G06F 1/32* (2019.01)
*G06F 1/24* (2006.01)
*G06F 1/3206* (2019.01)

(52) U.S. Cl.
CPC .............. *G06F 1/3206* (2013.01); *G06F 1/24* (2013.01)

(58) Field of Classification Search
CPC ...................................... G06F 1/26; G06F 1/32
See application file for complete search history.

(56) References Cited

U.S. PATENT DOCUMENTS

| | | | | |
|---|---|---|---|---|
| 5,935,224 A | * | 8/1999 | Svancarek | G06F 13/385 463/36 |
| 6,101,076 A | * | 8/2000 | Tsai | G06F 11/0745 361/115 |
| 2003/0110319 A1 | * | 6/2003 | Kim | G06F 13/4286 710/1 |
| 2009/0230773 A1 | * | 9/2009 | Tan | H04N 1/00899 307/48 |
| 2010/0023744 A1 | * | 1/2010 | Markel | G06F 21/85 713/2 |
| 2011/0145445 A1 | * | 6/2011 | Malamant | G06F 1/3287 710/16 |
| 2014/0115202 A1 | * | 4/2014 | Yoshinaga | G06F 13/426 710/62 |
| 2015/0067896 A1 | * | 3/2015 | Gundam | G06F 21/85 726/34 |
| 2016/0261128 A1 | * | 9/2016 | Johnston | H02J 7/00 |
| 2017/0111455 A1 | * | 4/2017 | Raju | H04L 67/025 |
| 2018/0210783 A1 | * | 7/2018 | Sasahara | G06F 9/4411 |

* cited by examiner

*Primary Examiner* — Phil K Nguyen
(74) *Attorney, Agent, or Firm* — Michelle F. Murray; Charles A. Brill; Frank D. Cimino

(57) ABSTRACT

A system includes an adapter port and a control circuit coupled to the adapter port. The system also includes host hardware coupled to the control circuit. The control circuit is configured to reset the host hardware in response to detecting an adapter removal pattern at the adapter port.

18 Claims, 4 Drawing Sheets

HOST HARDWARE RESET BASED ON ADAPTER REMOVAL PATTERN

BACKGROUND

Electronic devices are subject to software freezes or other states of inoperability. In such scenarios, a power reset of the electronic device needs to be performed. One way to reset power for an electronic device is to remove and re-insert its battery. However, there are many electronic devices where the battery is not intended to be removed by the end-user. For example, one trend in wearable electronic devices (e.g., a watch) is to have no physical buttons and a captive battery for cost savings and waterproofing. Resetting power for an electronic device with a captive battery is not a trivial task.

SUMMARY

In accordance with at least some examples, a system comprises an adapter port and a control circuit coupled to the adapter port. The system also comprises host hardware coupled to the control circuit. The control circuit is configured to reset the host hardware in response to detecting an adapter removal pattern at the adapter port.

In accordance with at least some examples, a device comprises an adapter port and a control circuit coupled to the adapter port. The device also comprises a battery coupled to the control circuit and host hardware coupled to the control circuit. The control circuit comprises a timer configured to provide a timer interval. The control circuit also comprises a pulse counter configured to count adapter removal events. The control circuit also comprises a controller coupled to the timer and the pulse counter, wherein controller is configured to temporarily decouple the battery and the adapter port from the host hardware in response to a predetermined adapter removal pattern.

In accordance with at least some examples, a device comprises an adapter port and a control circuit coupled to the adapter port. The device also comprises a battery coupled to the control circuit and host hardware coupled to the control circuit. The device also comprises a first switch between the battery and the host hardware. The device also comprises a second switch between the adapter port and the host hardware. The control circuit is coupled to a control terminal of the first switch and to a control terminal of the second switch. The control circuit comprises an adapter removal pattern detection circuit.

BRIEF DESCRIPTION OF THE DRAWINGS

For a detailed description of various examples, reference will now be made to the accompanying drawings in which.

DETAILED DESCRIPTION

Disclosed herein are systems, devices, and methods involving a host hardware reset in response to an adapter removal pattern. A host hardware reset of a device or system is performed, for example, in response to a software freeze or other state of inoperability. In such case, an end-user is able to initiate a host hardware reset by performing an adapter removal pattern involving removal and insertion of an adapter multiple times into an adapter port of a device or system.

In some examples, a device or system includes an adapter port and a control circuit coupled to the adapter port. The device or system also comprises a battery and host hardware coupled to the control circuit. The control circuit is configured to reset the host hardware in response to detecting an adapter removal pattern at the adapter port. For example, in response to detecting the adapter removal pattern, the control circuit performs a host hardware reset by temporarily decoupling the battery and the adapter port from the host hardware.

In some examples, the adapter removal pattern involves counting electrical pulses generated by insertion and removal of an adapter from the adapter port. In some examples, the control circuit includes a timer configured to provide a timer interval, and a pulse counter configured to count adapter removal events. The control circuit also includes a controller coupled to the timer and the pulse counter, where the controller is configured to temporarily decouple the battery and the adapter port from the host hardware in response to a predetermined adapter removal pattern.

An example of the predetermined adapter removal pattern is achieved by removing and inserting an adapter into the adapter port multiple times within a threshold amount of time. The act of removing and inserting the adapter into the adapter port results in an electrical pulse that is detected by the pulse counter. In some examples, the controller initiates a host hardware reset in response to detecting at least three electrical pulses within the timer interval, where each of the electrical pulses has a minimum threshold pulse duration. Also, the space or gap between adjacent electrical pulses may have a minimum threshold gap duration. In some examples, the timer interval is 8 seconds, the minimum threshold pulse duration is 100 ms, and the minimum threshold gap duration is 100 ms. In other examples, the timer interval, the minimum threshold pulse duration, and the minimum threshold gap duration may vary. By using the timer interval, the minimum threshold pulse duration, and the minimum threshold gap duration, the adapter removal pattern is detectable while ignoring glitches or other false detection. To provide a better understanding, various adapter removal pattern detection and response options, along with related systems, devices, and methods are described using the figures as follows.

Figure 1:
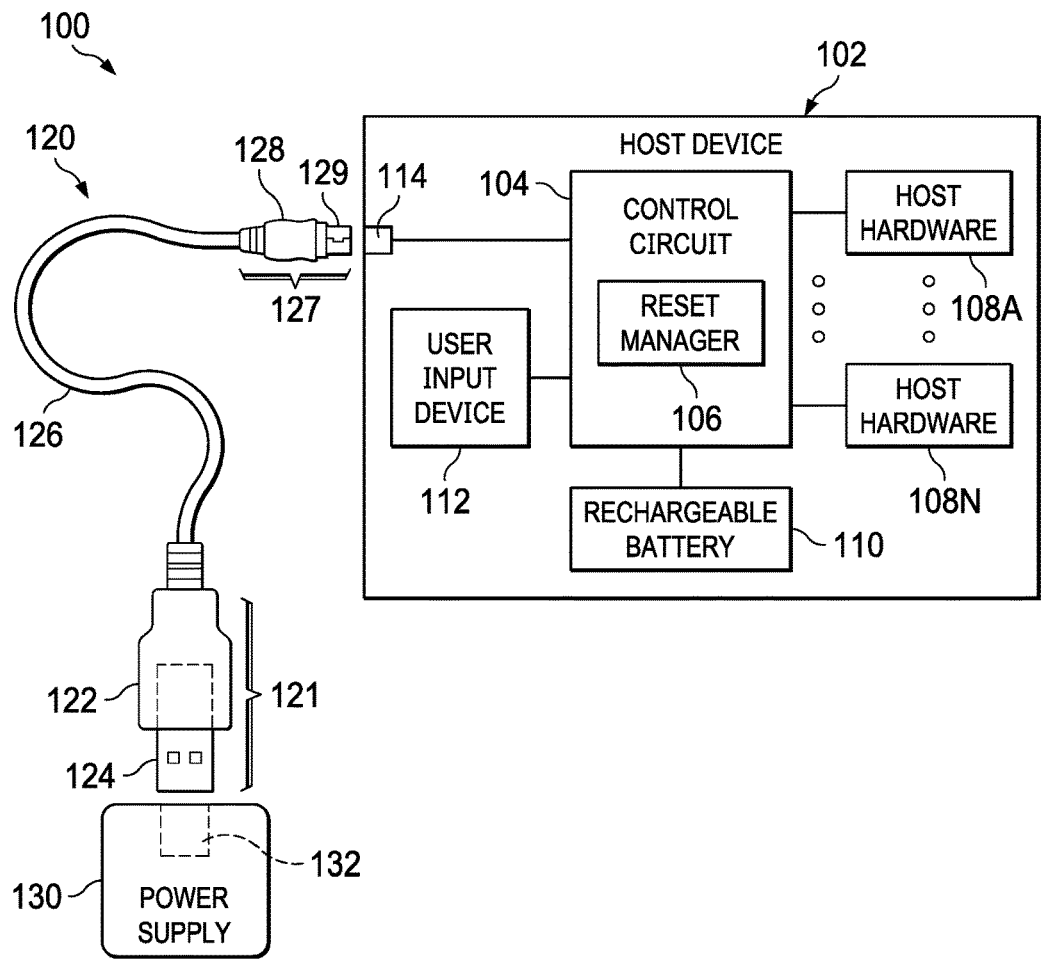
FIG. 1 is a block diagram showing a system in accordance with various examples.

FIG. 1 is a block diagram showing a system 100 in accordance with various examples. As shown, the system 100 includes a host device 102, which represents a consumer device, a wearable device (e.g., a watch), or another device with a rechargeable battery 110. When the host device 102 is coupled to a power supply 130 via an adapter cable 120, the rechargeable battery 110 is recharged. In different scenarios, the host device 102 is on or off while receiving power from the power supply 130. In either of these scenarios, the rechargeable battery 110 may be charged while the host device 102 receives power from the power supply 130 via the adapter cable 120.

In some examples, the adapter cable 120 includes a power supply adapter 121 with a first adapter plug 124 and a housing 122. When the first adapter plug 124 is inserted into a corresponding adapter port 132 of the power supply 130, power from the power supply is conveyed via wires 126 and is available at the host device adapter 127 that includes a second adapter plug 129 and a housing 128. To provide power to the host device 102, the second adapter plug 129 of the host device adapter 127 is coupled to a corresponding adapter port 114 of the host device 102. In some examples, the plug/port arrangement represented in FIG. 1 is replaced on one or both sides (the power supply side or the host device side with a continuous connection). Alternatively, the plug/port arrangement represented in FIG. 1 is replaced on one of both sides with an inductive coupling arrangement. Also, in some examples, the power supply 130 represents a computer device with a peripheral port (e.g., a USB port). In such case, data may be exchanged between the power supply 130 and the host device 102 (to set up the host device 102 a d/or to update software of the host device 102).

In the example of FIG. 1, the host device 102 comprises a control circuit 104 coupled to the adapter port 114 and to the rechargeable battery 110. The host device 102 also includes sets of host hardware 108A-108N coupled to the control circuit 104, where each of the sets of host hardware 108A-108N is configured to receive a different voltage level from the control circuit 104. In some examples, the host device 102 includes a user input device 112 (e.g., a button) coupled to the control circuit 104.

As shown in FIG. 1, the control circuit 104 includes a reset manager 106. In operation, the reset manager 106 is configured to detect and respond to an adapter removal pattern. An example adapter removal pattern involves removal and insertion of the second adapter plug 129 relative to the adapter port 114 (assuming the power supply 130 is turned on and power is available at the second adapter plug 129). In some examples, the reset manager 106 is configured to reset the set of host hardware 108A-108N in response to detecting an adapter removal pattern that involves removing and inserting the second adapter plug 129 into the adapter port 114 multiple times within a threshold amount of time. More specifically, the adapter removal pattern is detected by the reset manager 106 by monitoring electrical pulses resulting from removal and insertion of the second adapter plug 129 into the adapter port 114. If a predetermined number of electrical pulses are detected within a threshold amount of time, the reset monitor 106 performs a reset of the set of host hardware 108A-108N by decoupling the sets of host hardware 108A-108N from the rechargeable battery 110 and from the adapter port 114.

In some examples, an adapter removal pattern is detected when a first electrical pulse, a second electrical pulse, and a third electrical pulse are detected, where the first electrical pulse is spaced from the second electrical pulse by a first gap having at least a threshold gap duration, and where the second electrical pulse is spaced from the third electrical pulse by a second gap having at least the threshold gap duration. Also, the duration of each of the first electrical pulse, the second electrical pulse, and the third electrical pulse are at least a threshold pulse duration. In some examples, the threshold amount of time in which to detect an adapter removal pattern is 8 seconds or less. Also, the threshold gap duration is 100 ms or more. Also, the threshold pulse duration is 100 ms or more.

In some examples, the reset manager 106 combines detection of the adapter removal pattern with at least one requirement before initiating a reset of the sets of host hardware 108A-108N. More specifically, in some examples, the reset manager 106 is configured to reset the set of host hardware 108A-108N in response to detecting the adapter removal pattern in combination with user input to the user input interface 112 (e.g., a user pressing a button for at least a threshold amount of time). Additionally or alternatively, the reset manager 108 is configured to reset the sets of host hardware 108A-108N in response to detecting the adapter removal pattern in combination with detecting no communication from at least one component of the set of host hardware 108A-108N within the threshold amount of time used for detection of the adapter removal pattern.

Figure 2:
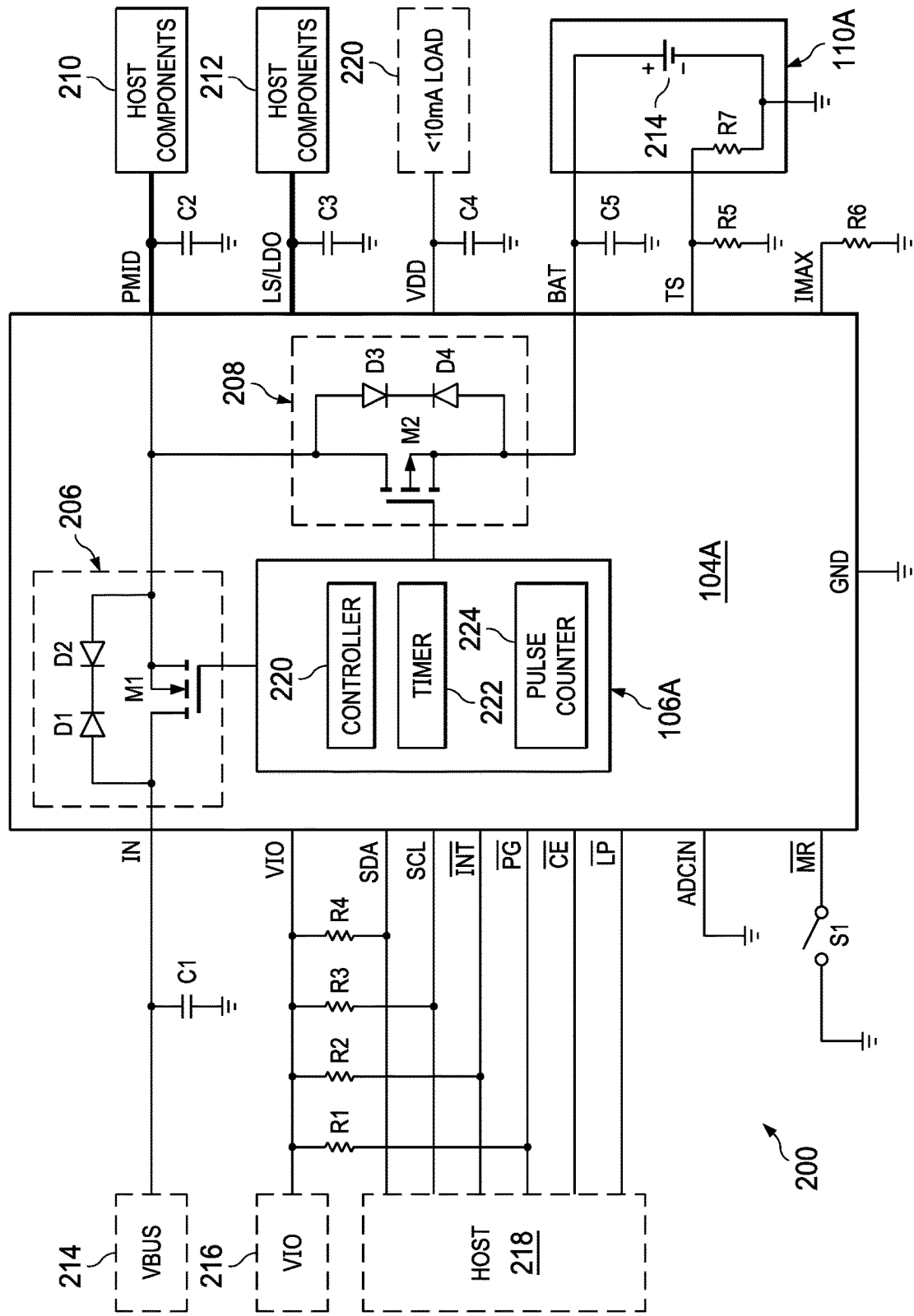
FIG. 2 is a block diagram showing a host device in accordance with various examples.

FIG. 2 is a block diagram showing a host device 200 in accordance with various examples. The host device 200 of FIG. 2 is an example of the host device 102 of FIG. 1. As shown, the host device 200 comprises a control circuit 104A (an example of the control circuit 104A in FIG. 1), where the control circuit 104A includes a first switch 206 and a second switch 208 coupled to a reset manager 106A (an example of the reset manager 106 in FIG. 1).

In some examples, the first switch 206 includes a transistor (M1) with a control terminal, a first current terminal, and a second current terminal. The first switch 206 also includes two diodes (D1, D2) between the first and second current terminals of M1. More specifically, the anode of D1 is coupled to the first current terminal of M1, the anode of D2 is coupled to the second current terminal of M1, and the cathodes of D1 and D2 are coupled together. Also, the control terminal of M1 is coupled to the reset manager 106A. In some examples, the second switch 208 includes a transistor (M2) with a control terminal, a first current terminal, and a second current terminal. The second switch 208 also includes two diodes (D3, D4) between the first and second current terminals of M2. More specifically, the anode of D3 is coupled to the first current terminal of M2, the anode of D4 is coupled to the first current terminal of M2, and the cathodes of D3 and D4 are coupled together. Also, the control terminal of M2 is coupled to the reset manager 106A.

In the example host device 200 of FIG. 2, the first current terminal of M1 is coupled to the top plate of a first capacitor (C1) and to a VBUS node 214, where the bottom plate of C1 is coupled to a ground node. In some examples, the VBUS node 214 in FIG. 2 is coupled to an adapter port such as the adapter port 114 in FIG. 1. Meanwhile, the second current terminal of M1 is coupled to a first set of host components 210 and to the top plate of a second capacitor (C2) via a PMID pin of the control circuit 104A. As shown, the bottom plate of C2 is coupled to a ground node.

In the example of FIG. 2, the second current terminal of M1 is coupled to the first current terminal of M2, and second current terminal of M2 is coupled to a battery 110A (an example of the battery 110 in FIG. 1). In FIG. 2, the battery 110A is represented as a voltage source 214 in series with a resistor (R7). In the host device 200 of FIG. 2, the control circuit 104A enables power at a first voltage level to be provided from the VBUS node 214 to the first set of host components 210. The control circuit 104A also enables power at a second voltage to be provided to a second set of host components 212. More specifically, in the example of FIG. 2, the control circuit 104A provides a supply voltage at an LS/LDO pin, which results in the second set of host components 212 receiving power at the second voltage level. For example, in some examples, a low dropout regulator or LDO circuit (not shown) converts the supply voltage at the LS/LDO pin of the control circuit 104A to the second voltage level for use by the second set of host components 212. As shown, the LS/LDO pin of the control circuit 104A is coupled to the top plate of a third capacitor (C3). The bottom plate of C3 is coupled to a ground node.

Various other pins are represented for the control circuit 104A of FIG. 2. More specifically, the control circuit 104A is represented as including a VDD pin coupled to a load 220 and to the top plate of a fourth capacitor (C4). As shown, the bottom plate of C4 is coupled to a ground node. Also, the control circuit 104A is represented as including a BAT pin coupled to the positive terminal of the battery 110A and to the top plate of a fifth capacitor (C5). Also, the control circuit 104A is represented as including a temperature sense (TS) pin coupled to R7 of the battery 110A. Also, the control circuit 104A is represented as including a maximum current (IMAX) pin coupled to a ground node via a resistor (R6). Also, the control circuit 104A is represented as including a reset ($\overline{MR}$) pin coupled to a ground node via a switch (S1). Also, the control circuit 104A is represented as including an external analog-to-digital converter input (ADCIN) pin coupled to a ground node. Also, the control circuit 104A is represented as including various pins coupled to a host interface 218 (e.g., the host interface 218 is a communication interface between the control circuit 104A and other components such as a host processor). More specifically, the control circuit 104A includes a low power mode ($\overline{LP}$) pin, a charge enable ($\overline{CE}$) pin, a power good ($\overline{PG}$) pin, an interrupt ($\overline{INT}$) pin, a serial clock line (SCL) pin, and a serial data line (SDA) pin coupled to the host interface 218. Also, the control circuit 104A is represented as including an input offset voltage (VIO) pin coupled to a VIO interface 216, and to the $\overline{PG}$ pin, the $\overline{INT}$ pin, the SCL pin, and the SDA pin. More specifically, the VIO pin is coupled to the $\overline{PG}$ pin via a resistor (R1), is coupled to the $\overline{INT}$ pin via another resistor (R2), is coupled to the SCL pin via another resistor (R3), and is coupled to the SDA pin via another resistor (R4).

In the example of FIG. 2, the reset manager 106A is configured to detect and respond to an adapter removal pattern. An example adapter removal pattern involves removal and insertion of an adapter plug (e.g., the second adapter plug 129 in FIG. 1) relative to a host device port (e.g., the adapter port 114 in FIG. 1) coupled to the VBUS node 214. In some examples, the reset manager 106A is configured to reset the sets of host hardware 210 and 212 (examples of the sets of host hardware 108A-108N in FIG. 1) in response to detecting an adapter removal pattern that involves removal and insertion of an adapter plug (e.g., the second adapter plug 129 in FIG. 1) relative to a host device port (e.g., the adapter port 114 in FIG. 1) coupled to the VBUS node 214, where removal and insertion of the adapter plug is performed multiple times within a threshold amount of time.

In the example of FIG. 2, the adapter removal pattern is detected by the reset manager 106A using the controller 220, the timer 222, and the pulse counter 224. More specifically, the timer 222 is configured to provide a timer interval (the threshold amount of time described in FIG. 1), and the pulse counter 224 is configured to count electrical pulses that occur within the timer interval. If the number of electrical pulses counted by the pulse counter 224 within the timer interval provided by the timer 222 is greater than a threshold amount, then the controller 220 initiates a reset of the sets of host hardware 210 and 212. In some examples, the reset manager 106A monitors electrical pulses resulting from removal and insertion of an adapter plug (e.g., the second adapter plug 129 in FIG. 1) into a host device port (e.g., the adapter port 114 in FIG. 1) coupled to the VBUS node 214. If a predetermined number of electrical pulses are detected within a threshold amount of time, the reset monitor 106A performs a reset of the set of host hardware 210 and 212 by decoupling the sets of host hardware 210 and 212 from the rechargeable battery 110A and from the VBUS node 214. In some examples, decoupling the sets of host hardware 210 and 212 from the rechargeable battery 110A and from the VBUS node 214 involves opening the first and second switches 206 and 208 (e.g., using respective control signals at the control terminals of M1 and M2).

In some examples, the timer 222 is configured to start a timer interval after a first adapter removal event, and the pulse counter 224 is configured to count a number of electrical pulses, resulting from removal and insertion of an adapter relative to an adapter port, that occur after the timer interval starts and before the timer interval ends at the threshold amount of time. The controller 220 is configured to initiate reset of the host hardware 210 and 212 in response to detecting that counts of the pulse counter 224 for the timer interval is greater than threshold number of counts associated with the adapter removal pattern.

In some examples, an adapter removal pattern is detected when a first electrical pulse, a second electrical pulse, and a third electrical pulse are detected, where the first electrical pulse is spaced from the second electrical pulse by a first gap having at least a threshold gap duration, and where the second electrical pulse is spaced from the third electrical pulse by a second gap having at least the threshold gap duration. Also, the duration of each of the first electrical pulse, the second electrical pulse, and the third electrical pulse are at least a threshold pulse duration. In some examples, the threshold amount of time in which to detect an adapter removal pattern is 8 seconds or less. Also, the threshold gap duration is 100 ms or more. Also, the threshold pulse duration is 100 ms or more.

In some examples, the reset manager 106A combines detection of the adapter removal pattern with at least one requirement before initiating a reset of the sets of host hardware 210 and 212. More specifically, in some examples, the reset manager 106A is configured to reset the sets of host hardware 210 and 212 in response to detecting the adapter removal pattern in combination with user input to a user input interface (not shown), such as a user pressing a button for at least a threshold amount of time. Additionally or alternatively, the reset manager 106A is configured to reset the sets of 210 and 212 in response to detecting the adapter removal pattern in combination with detecting no communication from at least one component of the set of host hardware 210 and 212 within the threshold amount of time used for detection of the adapter removal pattern.

Figure 3:
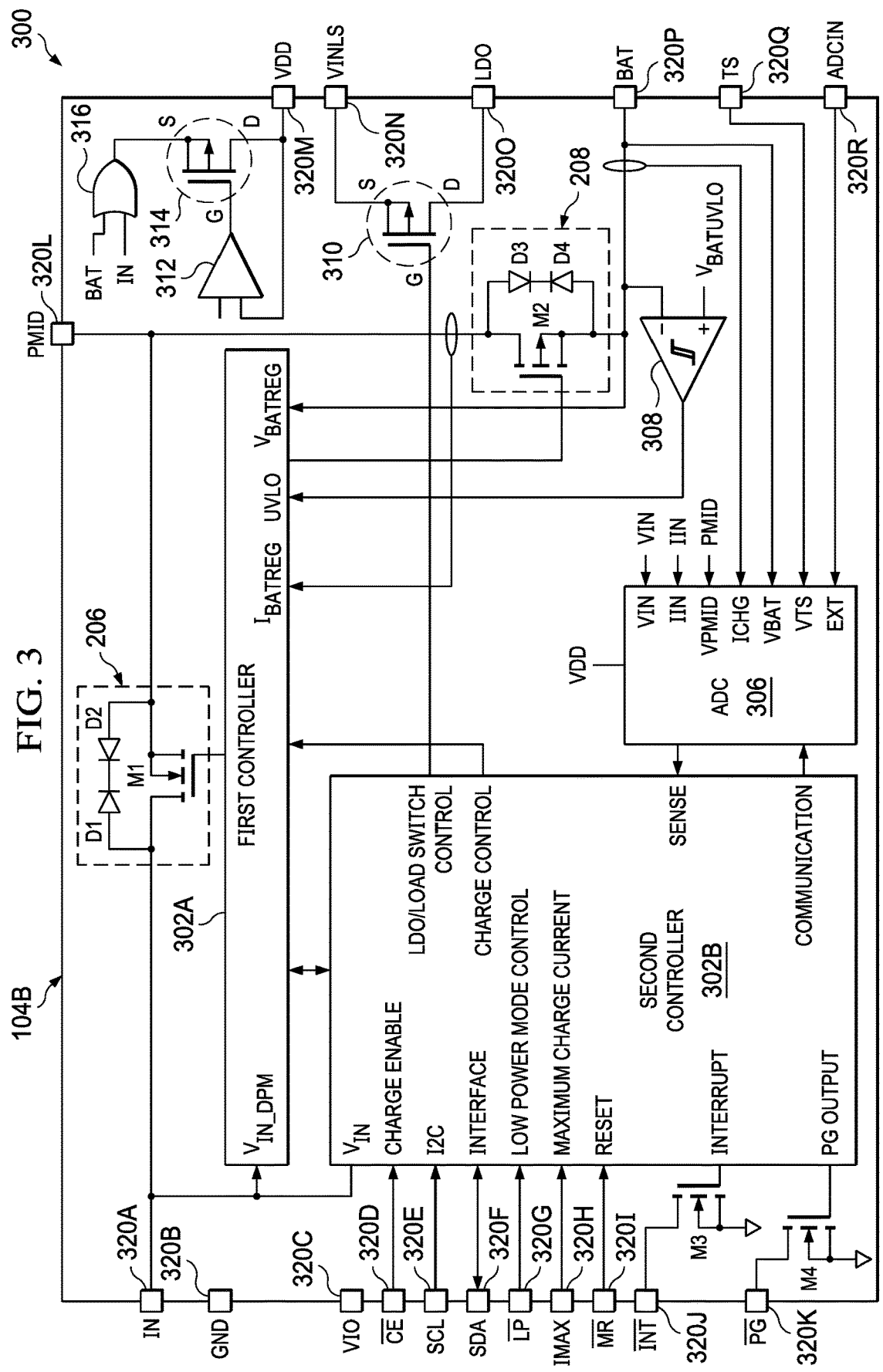
FIG. 3 is a block diagram showing a control circuit for detecting and responding to an adapter removal pattern in accordance with various examples.

FIG. 3 is a block diagram showing a control circuit 104B (an example of the control circuit 104 in FIG. 1, or the control circuit 104A in FIG. 2) for detecting and responding to an adapter removal pattern in accordance with various examples. As shown, the control circuit 104B comprises the first and second switches 206 and 208 described in FIG. 2, where the first and second control switches 206 are coupled to a first controller 302A configured to control when the first and second switches 206 and 208 are turned on or off. As shown, the control circuit 104B also includes a second controller 302B coupled to the first controller 302A. In the example of FIG. 3, the second controller 302B provides a charge control signal to the first controller 302A, where the charge control signal determines when the second switch 208 is turned on to enable charging of a battery coupled to the BAT node 320P. The BAT node 320P is also coupled to a voltage regulation input ($V_{BATREG}$) node of the first controller 302A. As shown, the BAT node 320P is also coupled to an input node of a comparator 308, which compares the voltage at BAT node 320P with an undervoltage lockout reference voltage ($V_{BATUVLO}$). The output of the comparator 308 is provided to a undervoltage lockout (UVLO) node of the first controller 302A. In response to a UVLO scenario, the first controller 302A is configured to open the second switch 208 to stop charging a battery (due to an undervoltage condition of the battery). In some examples, the first controller 302A also receives a current measurement of the current at the second switch 208, where the measured current is provided to a battery regulation node ($I_{BATREG}$) for use in monitoring battery charging operations. The first controller 302A also receives an input supply voltage at a dynamic power management node ($V_{IN\_DPM}$), where the input supply voltage is provided by an input node 320A of the control circuit 104A. In some examples, the input node 320A is coupled to an adapter port (e.g., the adapter port 114 in FIG. 1) as described herein.

In the example of FIG. 3, the second controller 302B is also configured to provide an LDO/load switch control signal to a transistor 310. More specifically, the control terminal of the transistor 310 is coupled to an LDO/load switch control node of the second controller 302B. Also, the first current terminal of the transistor 310 is coupled to a load switch node (VINLS) 320N of the control circuit 104B. Meanwhile, the second current terminal of the transistor 310 is coupled to an LDO node 320O of the control circuit 104B.

In the example of FIG. 3, the second controller 302B includes an input supply voltage (VIN) node coupled to the IN node of the control circuit 320A. In some examples, the second controller 302B also includes a charge enable node, I2C interface nodes, a low power mode control node, a maximum charge current node, a reset node, an interrupt node, a PG output node, a sense node, and a communication node. As shown, the charge enable node of the second controller 302B is coupled to a respective CE node 320D of the control circuit 104B. The I2C interface nodes of the second controller 302B are coupled to a SCL node 320E and to a SDA node 320F of the control circuit 104B. The low power mode control node of the second controller 302B is coupled to a respective LP node 320G of the control circuit 104B. The maximum charge current node of the second controller 302B is coupled to a respective IMAX node 320H of the control circuit 104B. The reset node of the second controller 302B is coupled to a respective MR node 320I of the control circuit 1046. The interrupt node of the second controller 302B is coupled to a respective $\overline{INT}$ node 320J of the control circuit 104B via a transistor (M3). More specifically, the interrupt node of the second controller 302B is coupled a control terminal of M3, the first current terminal of M3 is coupled to the $\overline{INT}$ node 320J, and the second current terminal of M3 is coupled to a ground node. The power good output node of the second controller 302B is coupled to a respective $\overline{PG}$ node 320K of the control circuit 104B via a transistor (M4). More specifically, the power good output node of the second controller 302B is coupled a control terminal of M4, the first current terminal of M4 is coupled to the PG node 320K, and the second current terminal of M4 is coupled to a ground node. The communication node of the second controller 302B is coupled to analog-to-digital converter (ADC) logic 306 of the control circuit 104B. The sense node of the second controller 302B is also coupled to the ADC logic 306 of the control circuit 104B. In some examples, the sense node receives sense information from the ADC logic 306 such as battery temperature information, battery voltage information, and charge current information.

In some examples, the ADC logic 306 includes various input nodes including a VIN node, IIN node, a VPMID node, a ICHG node, a VBAT node, a VTS node, and an EXT node. The VIN node of the ADC logic 306 is configured to receive an input supply voltage (the same input supply voltage at the IN node 320A). The IIN node of the ADC logic 306 is configured to receive a voltage proportional to the current flowing into IN node 320A. The VPMID node of the ADC logic 306 is configured to receive the voltage level at the PMID node 320L. The ICH node of the ADC logic 306 is configured to receive the charge current at the BAT node 320P. The VBAT node of the ADC logic 306 is configured to receive the voltage level at the BAT node 320P. The VTS node of the ADC logic 306 is configured to receive temperature sense voltage at a respective TS node 320Q. The EXT node of the ADC logic 306 is configured to receive an external signal from an ADCIN node 320R of the control circuit 104B.

As shown in FIG. 3, the control circuit 104B also includes a VIO node 320C configured to receive an input offset voltage. Also, the control circuit 104B includes a VDD node 320M configured to provide battery power or adapter power. In some examples, the control circuit 104B includes an analog function 316 with input nodes coupled to the BAT node 320P and the IN node 320A. The output of the analog function 316 is passed to the VDD node 320M via a switch 314 controlled by the output of a comparator 312, which compares the signal at the VDD node 320M and a reference signal.

In some examples, the first and second controllers 302A and 302B in FIG. 3 perform the operations of a reset manager such as the reset manager 106 in FIG. 1, or the reset manager 106A in FIG. 2. In operation, the first and second controllers 302A and 302B are configured to detect and respond to an adapter removal pattern. An example adapter removal pattern involves removal and insertion of an adapter plug (e.g., the second adapter plug 129 in FIG. 1) relative to a host device port (e.g., the adapter port 114 in FIG. 1) coupled to the IN node 320A. In some examples, the first and second controllers 302A and 302B are configured to reset host hardware (e.g., the host hardware 108A-108N in FIG. 1, or the host hardware 210 and 212) in response to detecting an adapter removal pattern that involves removal and insertion of an adapter plug (e.g., the second adapter plug 129 in FIG. 1) relative to a host device port (e.g., the adapter port 114 in FIG. 1) coupled to the IN node 320A, where removal and insertion of the adapter plug is performed multiple times within a threshold amount of time.

In some examples, the adapter removal pattern is detected by the first and second controllers 302A and 302B using a timer (e.g., the timer 222 in FIG. 2), a pulse counter (e.g., the pulse counter 224), where the first and/or second controllers 302A and 302B include control circuitry to monitor the timer and pulse counter status. The first and/or second controllers 302A and 302B also include control circuitry to respond to detection of an adapter removal pattern by initiating a host hardware reset as described herein.

In some examples, an adapter removal pattern is detected when a first electrical pulse, a second electrical pulse, and a third electrical pulse are detected, where the first electrical pulse is spaced from the second electrical pulse by a first gap having at least a threshold gap duration, and where the second electrical pulse is spaced from the third electrical pulse by a second gap having at least the threshold gap duration. Also, the duration of each of the first electrical pulse, the second electrical pulse, and the third electrical pulse are at least a threshold pulse duration. In some examples, the threshold amount of time in which to detect an adapter removal pattern is 8 seconds or less. Also, the threshold gap duration is 100 ms or more. Also, the threshold pulse duration is 100 ms or more.

In some examples, the first and second controllers 302A and 302B combine detection of the adapter removal pattern with at least one requirement before initiating a host hardware reset. More specifically, in some examples, the first and second controllers 302A and 302B are configured to initiate a host hardware reset in response to detecting the adapter removal pattern in combination with user input to a user input interface (not shown), such as a user pressing a button for at least a threshold amount of time. Additionally or alternatively, the first and second controllers 302A and 302B are configured to initiate a host hardware reset in response to detecting an adapter removal pattern or adapter plug-in in combination with detecting no communication from at least one host hardware component within the threshold amount of time used for detection of the adapter removal pattern.

Figure 4:
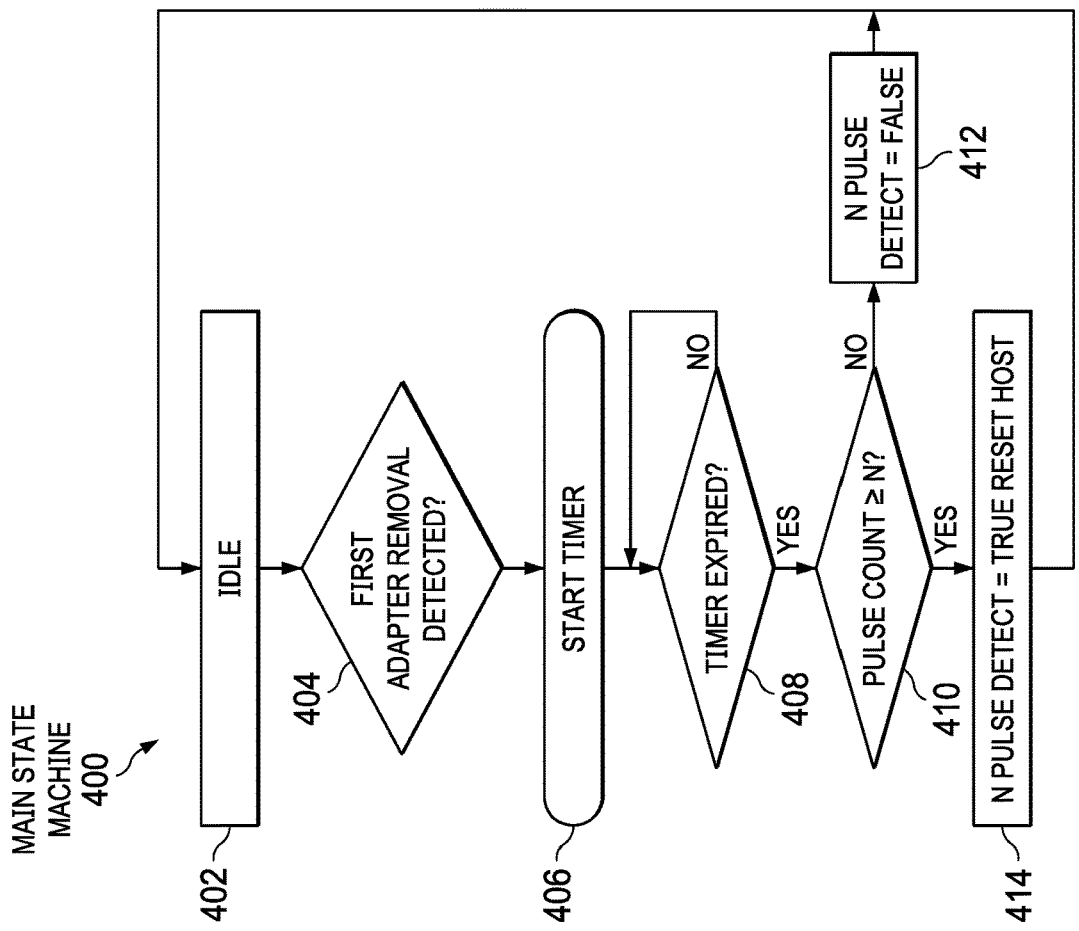
FIG. 4 is a flowchart showing an adapter removal pattern detection method in accordance with various examples.

FIG. 4 is a flowchart showing an adapter removal pattern detection method 400 in accordance with various examples. The method 400 is performed by a control circuit such as the control circuit 104 in FIG. 1, the control circuit 104A in FIG. 2, or the control circuit 104B in FIG. 3. As shown, the method 400 starts by idling at block 402. If a first adapter removal is detected (determination block 404), a timer is started at block 406. If the pulse count is less than N (determination block 410) and the timer has expired (determination block 408), the method 400 sets an N pulse detect flag to false at block 412 and returns to block 402. Otherwise, if the pulse count reaches N (determination block 410) when the timer expires (determination block 408), the method 400 sets an N pulse detect flag to true and initiates a host hardware reset at block 414. After block 414, the method 400 returns to block 402. In some examples, N in method 400 is 3. In other examples, N is another integer equal to 2 or more.

Figure 5:
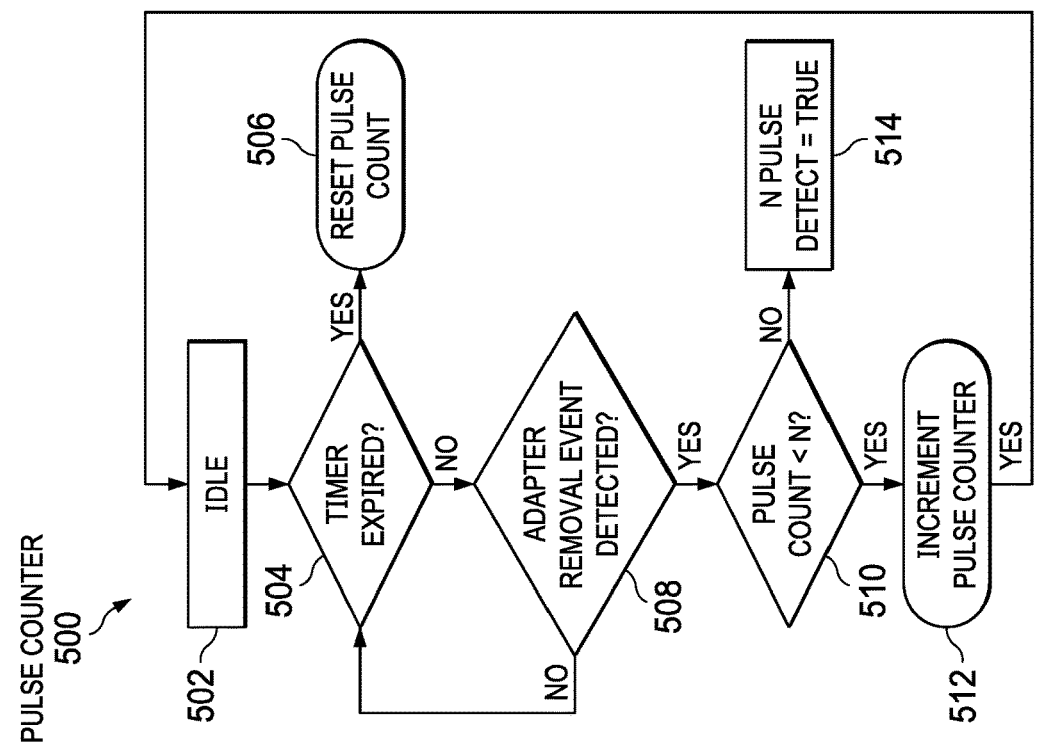
FIG. 5 is a flowchart showing a pulse counting method used for adapter removal pattern detection in accordance with various examples.

FIG. 5 is a flowchart showing a pulse counting method 500 used for adapter removal pattern detection in accordance with various examples. The method 500 is performed by a control circuit such as the control circuit 104 in FIG. 1, the control circuit 104A in FIG. 2, or the control circuit 104B in FIG. 3. In some examples, the method 500 is used for pulse counting for adapter removal pattern detection such as in the method 400. As shown, the method 500 starts by idling at block 502. If the timer has expired (determination block 504), the pulse count is reset at block 506. If the timer has not expired (determination block 504) and an adapter removal event is not detected (determination block 508), the method 500 returns to determination block 504. If the timer has not expired (determination block 504) and an adapter removal event is detected (determination block 508) and the pulse count is less than N (determination block 510), a pulse count is incremented at block 512. After block 512, the method 500 returns to block 502. If the timer has not expired (determination block 504) and an adapter removal event is detected (determination block 508) and the pulse count is equal to N or more (determination block 510), an N pulse detect flag is set to true at block 514.

Figure 6:
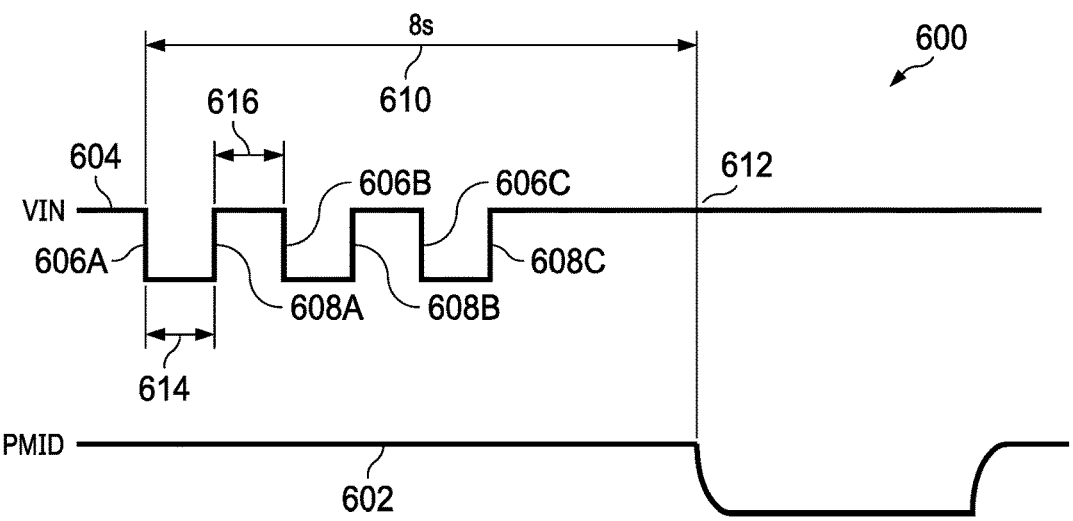
FIG. 6 is a diagram showing representative pulses of an adapter removal pattern relative to a host hardware reset in accordance with various examples.

FIG. 6 is a diagram showing an adapter removal pattern relative to a host hardware reset in accordance with various examples. In one example, an input supply voltage (VIN) waveform in FIG. 6 represents the signal input to the control circuit 104 from the adapter port 114 in FIG. 1. In another example, the VIN waveform in FIG. 6 represents the signal input to the control circuit 104A from the VBUS node 214 in FIG. 2. In another example, VIN waveform in FIG. 6 represents the signal input to the control circuit 104B from the IN node 320A in FIG. 3.

As shown in FIG. 6, the VIN waveform is initially high and subsequently includes various pulses corresponding to adapter removal transitions 606A-606C and adapter insertion transitions 608A-608C caused by removal and insertion of an adapter plug (e.g., the second adapter plug 129 in FIG. 1) relative to a host device port (e.g., the adapter port 114 in FIG. 1). In the example of FIG. 6, the first adapter removal transition 606A is used to start a timer interval 610 (e.g., 8 seconds). During the timer interval 610, VIN pulses resulting from the adapter removal transitions 606A-606C and the adapter insertion transitions 608A-608C are counted (3 VIN pulses are represented after the first adapter removal transitions 606A in FIG. 6). In some examples, each VIN pulse is counted only if the pulse width 616 is greater than a threshold pulse width (e.g., 100 ms). Also, in some examples, each VIN pulse is counted only if the gap width 614 (between adjacent pulses) is greater than a threshold gap width (e.g., 100 ms). In the example of FIG. 6, three VIN pulses within the timer interval 610 results in a host hardware reset, such that the PMID waveform (the host hardware supply voltage) transitions from high-to-low at time 612. Later, power to the host hardware is restored (the PMID waveform transitions from low-to-high). In different examples, adapter removal pattern detection criteria, such as the timer interval, the threshold gap width, and the threshold pulse width may vary.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ." The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. For example, it should be appreciated that an adapter removal pattern could be interpreted as an adapter plug-in pattern. Also, a single adapter removal or plug-in in combination with other triggers (button push, hardware inactivity, etc.) could be used to initiate a hardware reset. It is intended that the following claims be interpreted to embrace all such variations and modifications.

What is claimed is:

1. A system, comprising:
   an adapter port; and
   a control circuit coupled to the adapter port, the control circuit adapted to be coupled to host hardware, wherein the control circuit is configured to reset the host hardware in response to detecting an adapter removal pattern comprising:
      detecting a first electrical pulse at the adapter port;
      detecting a second electrical pulse after detecting the first electrical pulse; and
      detecting a third electrical pulse after detecting the second electrical pulse, the third electrical pulse within a threshold amount of time of the first electrical pulse.

2. The system of claim 1, wherein the first electrical pulse has at least a threshold pulse duration, the second electrical pulse has at least the threshold pulse duration, and the third electrical pulse has at least the threshold pulse duration.

3. The system of claim 2, wherein the first electrical pulse is spaced from the second electrical pulse by a first gap having at least a threshold gap duration, and wherein the second electrical pulse is spaced from the third electrical pulse by a second gap having at least the threshold gap duration.

4. The system of claim 2, wherein the threshold amount of time is at most 8 seconds, and wherein the threshold pulse duration is at least 100 ms.

5. The system of claim 2, wherein the control circuit comprises a controller, a timer, and a pulse counter, wherein the timer is configured to start a timer interval after a first adapter removal event, wherein the pulse counter is configured to count a number of electrical pulses, resulting from removal and insertion of an adapter relative to the adapter port, that occur after the timer interval starts and before the timer interval ends at the threshold amount of time, and wherein the controller is configured to initiate reset of the host hardware in response to detecting that counts of the pulse counter for the timer interval is greater than threshold number of counts associated with the adapter removal pattern.

6. The system of claim 1, wherein the system further comprises a battery coupled to the control circuit, wherein the control circuit is configured to reset the host hardware by electrically decoupling the battery from the host hardware in response to detecting the adapter removal pattern.

7. The system of claim 1, wherein the control circuit is configured to provide different voltage levels to different sets of the host hardware, and wherein reset of the host hardware involves resetting the different sets of the host hardware.

8. The system of claim 1, wherein the system comprises a user input interface, and wherein the control circuit is configured to reset the host hardware in response to detecting the adapter removal pattern in combination with user input to the user input interface.

9. The system of claim 1, wherein the control circuit is configured to reset the host hardware in response to detecting the adapter removal pattern in combination with detecting no communication from at least one component of the host hardware within the threshold amount of time.

10. A device, comprising:
an adapter port;
a control circuit coupled to the adapter port;
a battery coupled to the control circuit; and
host hardware coupled to the control circuit,
wherein the control circuit comprises:
   a timer configured to start a timer interval responsive to detecting a first adapter removal event at the adapter port;
   a pulse counter configured to count adapter removal events within a threshold amount of time of the timer starting, to produce a pulse count for the timer interval; and
   a controller coupled to the timer and to the pulse counter, wherein the controller is configured to decouple the battery and the adapter port from the host hardware in response to detecting that the pulse count for the timer interval is greater than a threshold pulse count.

11. The device of claim 10, wherein the battery is in a sealed compartment.

12. The device of claim 10, wherein the control circuit is configured to temporarily decouple the battery and the adapter port from the host hardware in response to detecting an adapter removal pattern that involves detecting falling edges for at least three adapter removal events within the timer interval.

13. The device of claim 10, wherein the control circuit is configured to temporarily decouple the battery and the adapter port from the host hardware in response to detecting an adapter removal pattern that involves detecting rising edges for at least three adapter insertion events within the timer interval.

14. The device of claim 10, wherein the pulse counter detects a first electrical pulse, a second electrical pulse, and a third electrical pulse, wherein the first electrical pulse is spaced from the second electrical pulse by a threshold gap duration, and wherein the second electrical pulse is spaced from the third electrical pulse by the threshold gap duration.

15. The device of claim 10, wherein system comprises a button, and wherein the control circuit is configured to decouple the battery and the adapter port from the host hardware in response to detecting that the pulse count for the timer interval is greater than the threshold pulse count in combination with a user pressing the button.

16. The device of claim 10, wherein the controller is configured to decouple the battery and the adapter port from the host hardware in response to detecting that the pulse count for the timer interval is greater than the threshold pulse count in combination with detecting no communication from at least one component of the host hardware within the timer interval.

17. A device, comprising:
an adapter port;
a control circuit coupled to the adapter port, the control circuit adapted to be coupled to host hardware;
a battery coupled to the control circuit;
a first switch having a first control terminal, the first switch between the battery and the host hardware;
a second switch having a second control terminal, the second switch between the adapter port and the host hardware;
wherein the control circuit is coupled to the first control terminal and to the second control terminal, and wherein the control circuit comprises an adapter removal pattern detection circuit, and the control circuit is configured to reset the host hardware by temporarily opening the first switch and the second switch in response to an adapter removal pattern detected by the adapter removal pattern detection circuit.

18. The device of claim 17, wherein the adapter removal pattern detection circuit comprises:
a timer; and
a pulse counter; and
a controller coupled to the timer and the pulse counter.

* * * * *